US012693434B2

(12) United States Patent　　　　(10) Patent No.:　US 12,693,434 B2
　　Kohn et al.　　　　　　　　　　　(45) Date of Patent:　　　Jul. 28, 2026

(54) METHOD FOR AUTOMATICALLY MAPPING THE RADIATION IN A PORTION OF A BUILDING AND A ROBOT VEHICLE

(71) Applicant: FRAMATOME GmbH, Erlangen (DE)

(72) Inventors: Sebastian Kohn, Nuremberg (DE); Oliver Sommer, Erlangen (DE); Felix Jan Rösel, Erlangen (DE); Ansgar Kleideiter, Igensdorf (DE); Naeel Muhamad Ali, Nuremberg (DE); Frank Querfurth, Tuchenbach (DE)

(73) Assignee: FRAMATOME GmbH, Erlangen (DE)

( * ) Notice: Subject to any disclaimer, the term of this patent is extended or adjusted under 35 U.S.C. 154(b) by 178 days.

(21) Appl. No.: 18/695,354

(22) PCT Filed: Nov. 26, 2021

(86) PCT No.: PCT/EP2021/083199
　　§ 371 (c)(1),
　　(2) Date: Mar. 25, 2024

(87) PCT Pub. No.: WO2023/093997
　　PCT Pub. Date: Jun. 1, 2023

(65) Prior Publication Data
　　US 2024/0393481 A1　　Nov. 28, 2024

(51) Int. Cl.
　　*G01T 1/169*　　　　(2006.01)
　　*G01T 7/00*　　　　　(2006.01)
　　　　(Continued)

(52) U.S. Cl.
　　CPC ............... *G01T 1/169* (2013.01); *G01T 7/00* (2013.01); *G05D 1/246* (2024.01);
　　　　(Continued)

(58) Field of Classification Search
　　None
　　See application file for complete search history.

(56) References Cited

U.S. PATENT DOCUMENTS 5,936,240 A　　8/1999　Dudar et al.
2015/0190925 A1*　7/2015　Hoffman ................. B25J 9/161
　　　　　　　　　　　　　　　　　901/47
(Continued)

FOREIGN PATENT DOCUMENTS

CN　　　110231642 A　　9/2019
DE　202019002184 U1　　5/2019
　　　　(Continued)

OTHER PUBLICATIONS

Corresponding Search Report and Written Opinion for PCT/EP2021/083199.

(Continued)

*Primary Examiner* — Marcus H Taningco
(74) *Attorney, Agent, or Firm* — Davidson Kappel LLC

(57)　　　　ABSTRACT

A method is for automatically mapping the radiation in a portion of a building (7) using a robot vehicle (1). The portion of the building includes a plurality of building surfaces (9, 10). The method includes acquiring (1010) a 3D map (42) of a portion of a building (7). The 3D map (42) includes a plurality of segments (44), each representing a substantially flat building surface. The method further comprises applying (1020) to each segment (44) a plurality sectors forming a grid of sectors (46), each sector (46) having a border (48); physically marking, by the robot vehicle (1), the border (48) of each sector (46) with paint on the corresponding building surface (9, 10); and for one or more sectors (46), scanning, by the robot vehicle (1), with a radiation sensor (28) each sector (46), to measure the radioactive radiation within that sector.

10 Claims, 9 Drawing Sheets

(51) Int. Cl.

| | | |
|---|---|---|
| *G05D 1/246* | (2024.01) | |
| *G05D 105/80* | (2024.01) | |
| *G05D 109/12* | (2024.01) | |
| *G05D 111/10* | (2024.01) | |

(52) U.S. Cl.
CPC ..... *G05D 2105/87* (2024.01); *G05D 2105/89* (2024.01); *G05D 2109/12* (2024.01); *G05D 2111/10* (2024.01)

(56) References Cited

U.S. PATENT DOCUMENTS

| | | | |
|---|---|---|---|
| 2015/0234083 | A1 | 8/2015 | Mariella, Jr. et al. |
| 2015/0346363 | A1 | 12/2015 | Shadyavichyus |
| 2015/0363956 | A1* | 12/2015 | Komeda .................. G01T 7/00 250/336.1 |
| 2018/0236654 | A1 | 8/2018 | Mozeika et al. |
| 2021/0278834 | A1* | 9/2021 | Kendoul ............. G05D 1/0044 |
| 2024/0201384 | A1* | 6/2024 | Banks .................. G01S 17/894 |

FOREIGN PATENT DOCUMENTS

| | | | | |
|---|---|---|---|---|
| EP | | 542561 | A1 | 5/1993 |
| JP | | 2005274367 | A | 10/2005 |
| JP | | 2020046231 | A * | 3/2020 |
| KR | | 2608026 | B1 * | 11/2023 |
| WO | WO2019180386 | | A1 | 9/2019 |

OTHER PUBLICATIONS

Michael Mende et al., Environment Modeling and Path Planning for a Semi-Autonomous Manipulator System for Decontamination and Release Measurement, World Automation Congress, 2014, pp. 1-6.

* cited by examiner

METHOD FOR AUTOMATICALLY MAPPING THE RADIATION IN A PORTION OF A BUILDING AND A ROBOT VEHICLE

The present disclosure concerns a method for automatically mapping the radiation in a portion of a building using a robot vehicle, the portion of the building comprising a plurality of building surfaces, the method comprising:

acquiring a 3D map of a portion of a building, wherein the 3D map comprises a plurality of segments, each representing a substantially flat building surface.

Further, the present disclosure relates to a robot vehicle for automatically mapping the radiation in a portion of a building, in particular for performing the method according to one of the preceding claims, comprising:

a main body;

a plurality of cameras and/or sensors connected to the main body adapted to scan the environment of the robot vehicle;

a movement apparatus adapted to move the robot vehicle over a rough surface comprising steps; and at least one manipulator arm, having a plurality of segments, the segments being connected to an adjacent segment by a rotatable joint having one or more joint motors, the manipulator arm having a proximal end and a distal end.

BACKGROUND

When nuclear power plants are decommissioned, the radiation of the walls and the equipment must be measured and mapped in all rooms. Sometimes the walls and equipment must even be measured several times. This has been previously done by humans. However, the risk of exposure to radiation and contamination may be elevated for such a task.

CN 110231642 A discloses a method of constructing a radiation field map. For that purpose, a video image of the radiation is taken. Further, a positioning mapping is performed. This information is fused to obtain a radiation field map.

U.S. Pat. No. 5,936,240 discloses mobile robotic system that conducts radiological surveys to map alpha, beta, and gamma radiation on surfaces. For that purpose, the robot includes a LIDAR system for the navigation. The radiation data is gathered and mapped in order to provide a real-time printing of maps of floor contamination.

EP 542 561 A1 discloses a radiation mapping system using a mobile robot vehicle. The radiation mapping system includes a radiation detector system, which is attached to an L shaped structure, which can be moved using a motor.

SUMMARY

An object of the present disclosure is to improve the existing system, and in particular, to provide a system and a method, which can provide reliable results and which can be verified.

According to one aspect, a method for automatically mapping the radiation in a portion of a building using a robot vehicle, the portion of the building comprising a plurality of building surfaces, the method comprising:

acquiring a 3D map of a portion of a building, wherein the 3D map comprises a plurality of segments, each representing a substantially flat building surface; wherein the method further comprises applying to each segment a plurality sectors forming a grid of sectors, each sector having a border;

physically marking, by the robot vehicle, the border of each sector with paint on the corresponding building surface; and for one or more sectors, scanning, by the robot vehicle, with a radiation sensor each sector, to measure the radioactive radiation within that sector.

Further embodiments may relate to one or more of the following features, which may be combined in any technical feasible combination:

marking physically with paint a point on the building surface within each scanned sector with the highest measured radiation within the respective sector;

digitally marking the grid of sectors in the 3D map;

determining whether the radiation exceeds a predetermined radiation dose, and in case the radiation exceeds a predetermined radiation dose, marking physically the sector on the building surface by applying paint thereon;

each sector is marked, by the robot vehicle, on the building surface with an identifier using paint;

displaying the measured radioactive radiation on the 3D map;

taking, by the robot vehicle, a sample of the building surface in at least one sector, in particular at the point with the highest measured radiation within the at least one sector;

the physically marking is performed by spraying paint on the building surface; and/or the robot vehicle comprises a manipulator arm having a proximal end and a distal end and wherein a sensor support device being fixed to the distal end of the manipulator arm, the method further comprising, acquiring by the robot vehicle at least one image of the building surface, determining the borders of the sectors on the building surface based on the acquired image, and moving the robot vehicle and/or a manipulator arm of the robot vehicle based on the determined borders during scanning.

According to another aspect, a robot vehicle is provided for automatically mapping the radiation in a portion of a building, in particular for performing the method according to one of the preceding claims, comprising:

a main body;

a plurality of cameras and/or sensors connected to the main body adapted to scan the environment of the robot vehicle;

a movement apparatus adapted to move the robot vehicle over a rough surface comprising steps; and at least one manipulator arm, having a plurality of segments, the segments being connected to an adjacent segment by a rotatable joint having one or more joint motors, the manipulator arm having a proximal end and a distal end; wherein the robot vehicle further comprises:

a sensor support device being fixed to the distal end of the manipulator arm;

a radiation sensor for measuring radioactive radiation being fixed to the sensor support device; and a spray nozzle being fixed to the sensor support device.

Further embodiments may relate to one or more of the following features, which may be combined in any technical feasible combination:

the movement apparatus has at least two legs and/or wheels;

the distal end of the manipulator arm has six or more degrees of freedom;

the spray nozzle is in fluid connection with a pressurized paint tank;

The robot vehicle further comprising at least one distance control device which is adapted to control the distance of between the radiation sensor and a building surface to be measured;

the distance control device comprises at least three stoppers being in a fixed relationship with respect to the radiation sensor and/or the spray nozzle, the distal ends of the at least three stoppers spanning a plane, which is in a predetermined distance to the radiation sensor, wherein, in particular, the sensor measurement direction is perpendicular to the plane;

each stopper has a roller or a caster wheel at its distal end;

the distance control device comprises at least one distance sensor at the sensor support device and/or at least one internal controller adapted to estimate the distance between the radiation sensor and the building surface based on data of the one or more joint motors and/or sensors of the manipulator arm in connection with a determined distance between the robot vehicle and the building surface using the plurality of cameras and/or sensors; and/or the robot vehicle is adapted to acquire at least one image of a building surface by the plurality of cameras and/or sensors, to determine the borders of sectors on the building surface based on the acquired image, and to move the robot vehicle and/or an manipulator arm of the robot vehicle based on the determined borders during a scanning with the radiation sensor.

Further advantages, features, aspects and details are evident from the dependent claims, the description and the drawings.

BRIEF SUMMARY OF THE DRAWINGS

The accompanying drawings relate to embodiments of the present disclosure and are described in the following.

DETAILED DESCRIPTION

Figure 1:
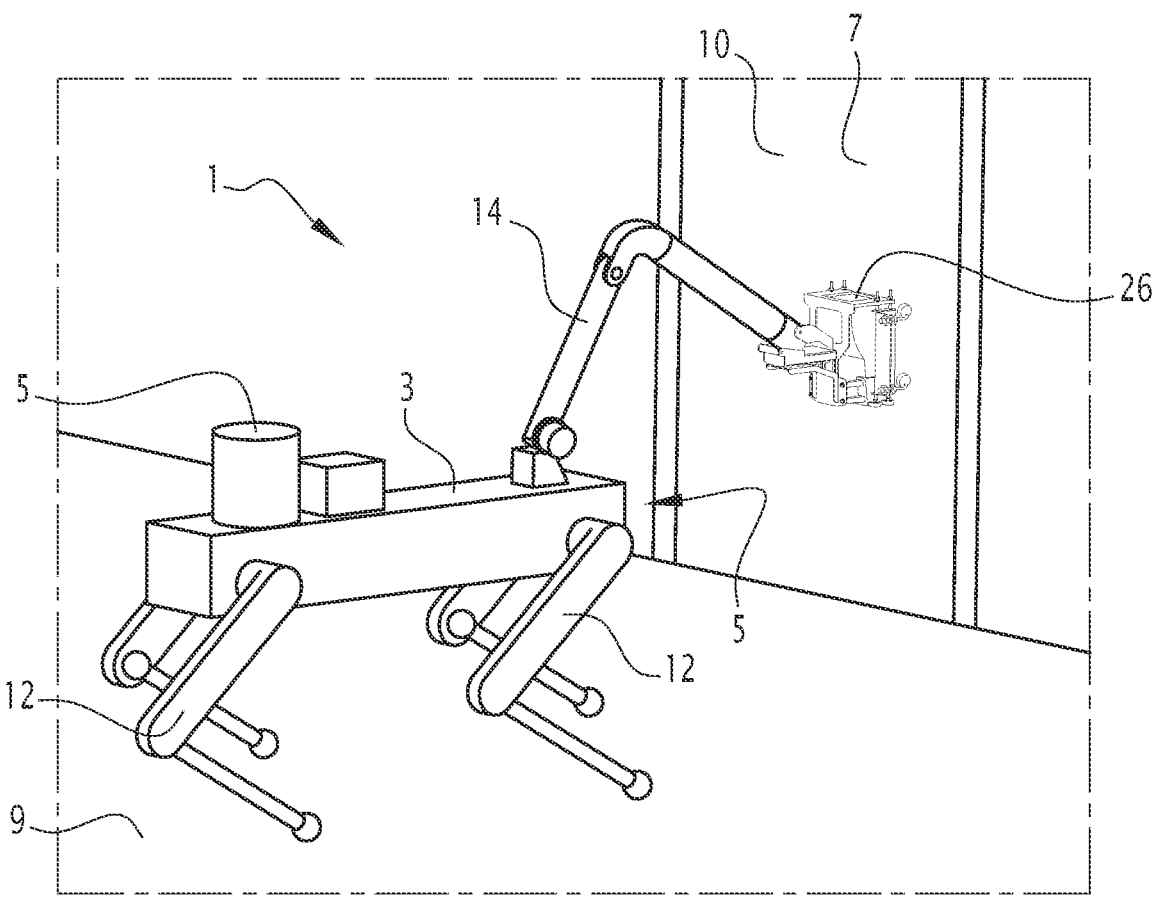
FIG. 1 shows a robot vehicle according to an embodiment.

FIG. 1 shows a robot vehicle 1. The robot vehicle 1 comprises a main body 3. On the main body 3 a plurality of cameras and/or sensors 5 are arranged. The cameras and sensors 5 are used for acquiring a 3D map of a portion of a building 7. For example, the plurality of cameras and/or sensors 5 are scanning the environment of the robot vehicle 1. The portion of the building 7 comprises building surfaces 9, 10, in particular substantially flat building surfaces. The building surfaces 9, 10 may comprise a floor 9 and/or one or more walls 10.

The plurality of cameras and/or sensors 5 are arranged on the main body 3 such that they can acquire the near and far environment of the robot vehicle 1.

In some embodiments, the building 7 is a building of a nuclear power plant.

The plurality of cameras and/or sensors 5 are used for determining the position of the robot vehicle within a building 7 and/or for determining the distance to objects within the building 7.

For example, at least one sensor of the plurality of cameras and/or sensors 5 is a LIDAR (Light amplification by Stimulated Emission of Radiation detection and ranging) sensor. The output of the LIDAR sensor can be used to calculated the distance between itself (the robot vehicle 1) and surrounding building surfaces 9, 10 in particular the walls 10. In some embodiments, other cameras of the plurality of cameras and/or sensors 5 are taking pictures of the near environment of the robot vehicle 1. The cameras may be also used to determine a distance, for example by taking also into account the distance moved by the robot vehicle 1.

Further, the robot vehicle 1 includes a movement apparatus 12. The movement apparatus 12 is provided for moving the robot vehicle through the building 7. The movement apparatus 12 is adapted to move the robot vehicle 1 about an area, which comprises steps. The steps may have a height of at least 10 cm, in particular of at least 15 cm.

The movement apparatus 12 has at least two legs and/or wheels. In the embodiment shown in FIG. 1, the movement apparatus has four legs. In some embodiments, each leg may have at least one wheel, in particular two wheels. The wheels may be propelled.

However, also other forms are possible. For example, the movement apparatus 12 may be provided with a front and back leg, with respectively two wheels.

The movement apparatus may enable the robot vehicle 1 to move autonomously through the portion of the building 7. In some embodiments, the movement of the robot vehicle 1 is controlled using a remote controller.

Further, a manipulator arm 14 is connected to the main body 3. The manipulator arm 14 includes a plurality of segments, which are in particular oblong. Each segment is connected to a neighbouring segment by a rotatable joint having one or more joint motors. Each segment may have also at least one end, which is rotatable about the longitudinal axis of the respective segment. Further, the manipulator arm 14 may include one or more sensors for detecting the movement and/or the positioning of the different segments, in particular to each other.

The manipulator arm 14 having a proximal end 16 and a distal end 18. The proximal end 16 being fixed rotatably to the main body 3, in particular about an axis, which is perpendicular to the upper surface of main body 3. For example, the proximal end can be rotated by −150 degrees to 180 degrees with respect to the main body.

In other words, the manipulator arm 14 can turn its distal end 18 in six or more degrees of freedom.

Figure 2:
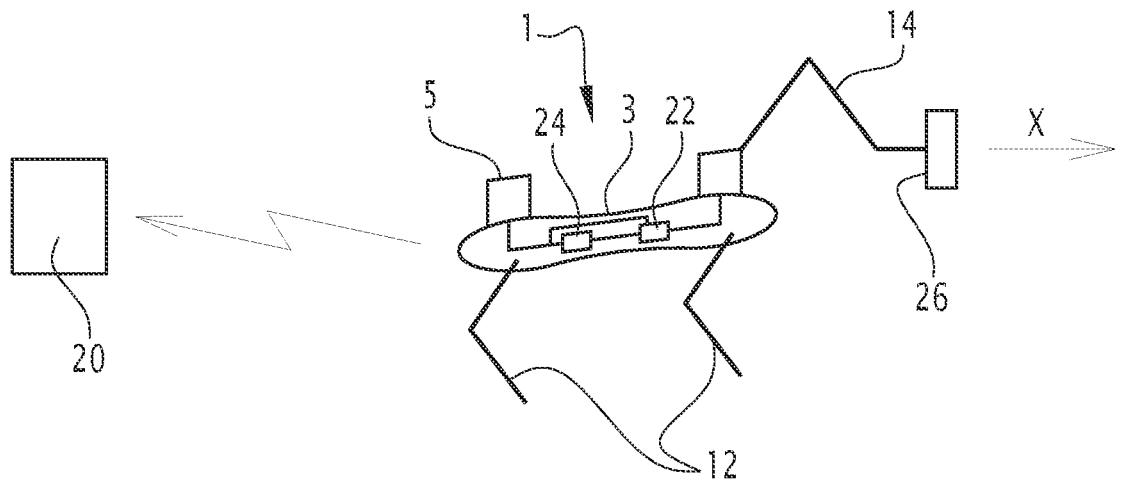
FIG. 2 shows schematically a system according to an embodiment.

FIG. 2 shows a system comprising a remote controller 20 and the robot vehicle 1. The robot vehicle 1 comprises at least one internal controller 22 and a wireless communication device 24. The at least one internal controller 22 is adapted to control the movement of the robot vehicle 1 and of the manipulator arm 14.

The remote controller 20 is for example a computer with a wireless communication device. The remote controller 20 may comprise a display for displaying the environment of the robot vehicle 1. For example, the at least one internal controller 22 is adapted to transmit the information acquired by the plurality of cameras and/or sensors 5 to the remote controller 20.

Further, the at least one internal controller 22 and/or the remote controller 20 are adapted to create a 3D (3 dimensional) map of at least a portion of the building 7 using the data provided by the plurality of cameras and/or sensors 5 and in particular of the movement apparatus 12.

For example, the portion of the building 7 (or the complete building 7) is scanned using the plurality of cameras and/or sensors 5 during the move of the robot vehicle 1 through the building or the portion of the building 7, as it will be explained later.

Figure 3:
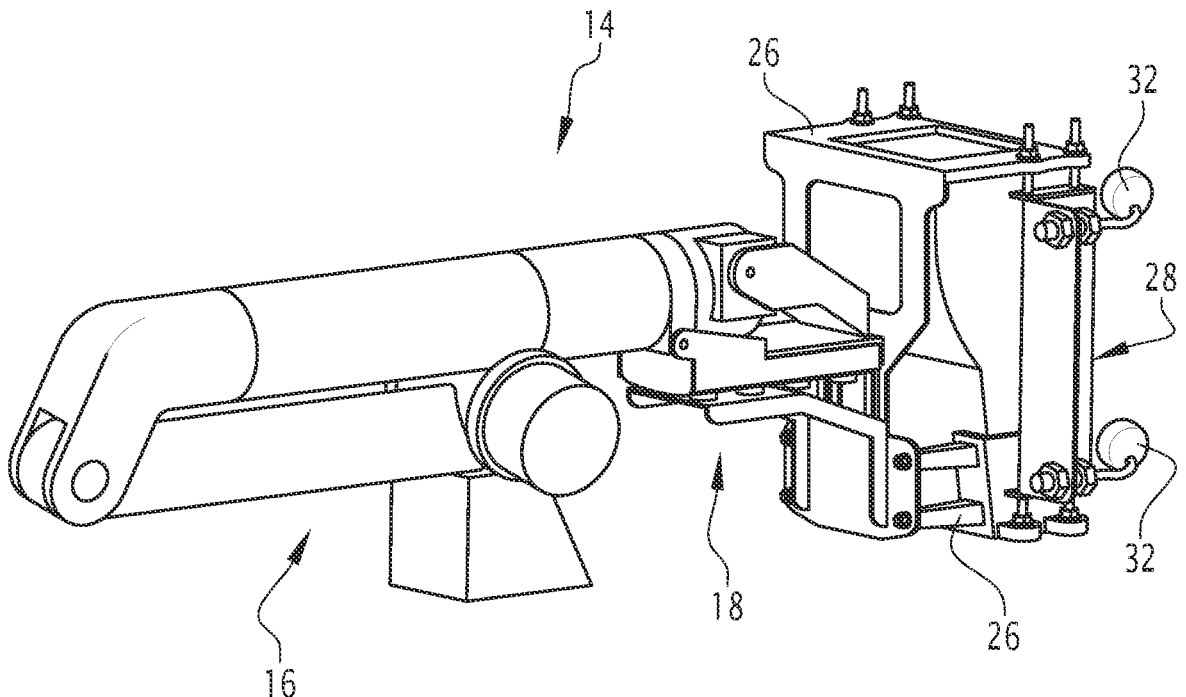
FIG. 3 shows a manipulator arm of the robot vehicle.

As it can be seen in FIGS. 1 and 3, a sensor support device 26 is fixed to the distal end 18 of the manipulator arm 14. The sensor support device 26 is adapted to be moved towards, in particular against, building surfaces 9, 10, in particular the walls 10 and/or the floor 9 of the building 7, by the manipulator arm 14.

Figure 4:
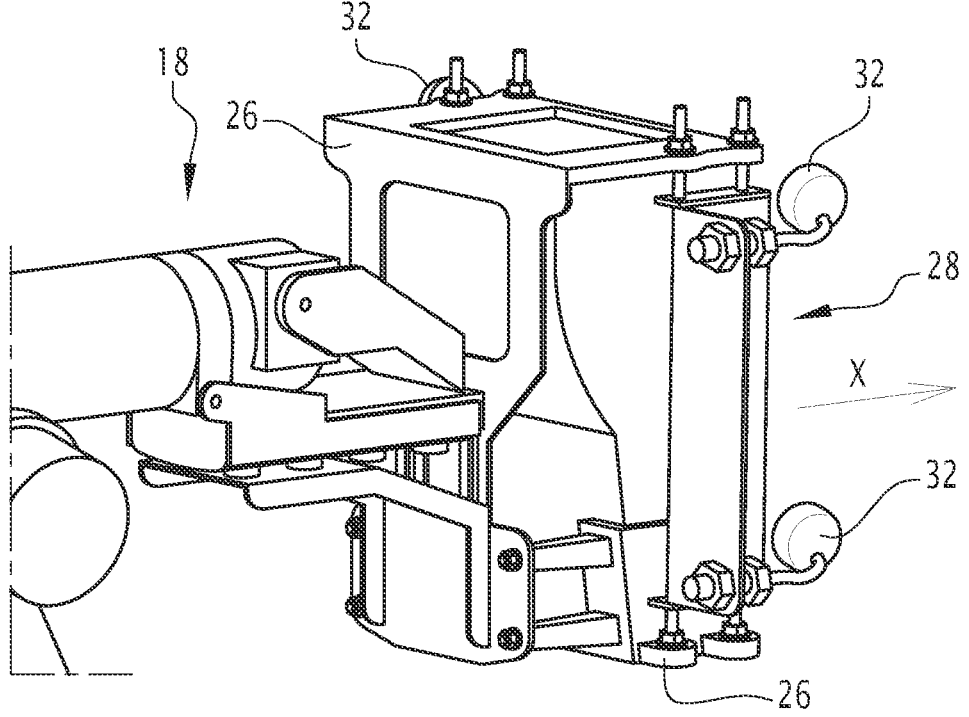
FIG. 4 shows schematically a distal end of the manipulator arm of the robot vehicle.
Figure 5:
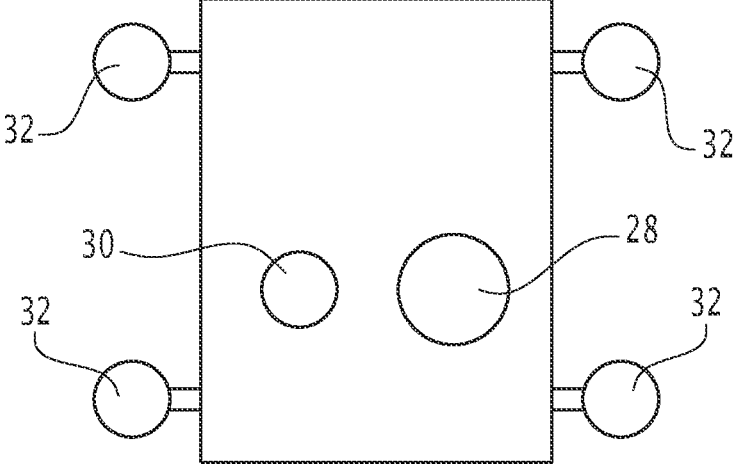
FIG. 5 shows a front view of the distal end of the manipulator arm of the robot vehicle.

As it is shown in FIGS. 3 to 5 a radiation sensor 28 for measuring radioactive radiation and a spray nozzle 30 are fixed to the sensor support device 26. The radiation measured by the radiation sensor 28 is for example alpha, beta and gamma radiation.

In some embodiments, the radiation sensor 28 is connected to signal processing circuitry (not shown) which is fixed to the body 3 of the robot vehicle. The signal processing circuit is adapted to provide the measured signals to the at least one internal controller 22 and/or the remote controller 20.

According to embodiments, which may be combined with other embodiments disclosed herein, a plurality of stoppers 32 are fixed to the sensor support device 26. The stoppers 32 are in a fixed relationship with respect to the radiation sensor 28 and/or the spray nozzle 30. The stoppers 32 can be provided, in some embodiments, with a roller or a caster wheel at their distal end. In FIG. 5 four stoppers 32 are shown. However also three or more than four stoppers 32 may be used. The stoppers 32, in particular the distal ends of the stoppers, span a plane, which is in a predetermined distance to the radiation sensor 28. For example, the sensor measurement direction X of the radiation sensor 28 is perpendicular to the plane, which is spanned by the stoppers.

The stoppers 32 are provided on each lateral side of the sensor support device 26, with respect to the measurement direction X of the radiation sensor 28. In some embodiments, the stoppers 32 have a distance of at least 5 cms, in particular of at least 10 cms from each other.

When the sensor support device 26 is pressed by the manipulator arm 14 against a building surface, for example the wall 10 or the floor 9, the stoppers 32 abut against the building surface 9, 10, so that the radiation sensor 28 is in a defined relationship, in particular a predefined distance, with respect to the building surface 9, 10 to be measured.

Thus, the stoppers 32 form a distance control device that enable the robot vehicle to position the radiation sensor 28 at a predefined distance to the building surface 9, 10.

Alternatively or additionally, at least one distance sensor, in particular contactless or mechanical distance sensors, may be used. The distance sensor may be an inductive, capacitive, laser, microwave or other type of sensor, which can measure a distance of a few centimetres with sub-millimetre accuracy. For example, each distance sensor provides its measurement results to the at least one internal controller 22. In some embodiments, which may be combined with other embodiments disclosed herein, two, three or more distance sensors are used. For example, in such a case, the distance sensors have a distance of at least 5 cms, in particular of at least 10 cms between each other.

Additionally or alternatively to the at least one distance sensors, for estimating the exact distance between the radiation sensor 28 and the building surface 9, 10, the at least one internal controller 22 may use information provided from the motors, in particular the one or more joint motors, and/or sensors of the manipulator arm 14, for example manipulator arm calculations and/or operations, in particular in connection with a determined distance between the robot vehicle 1 and the building surface using the plurality of cameras and/or sensors 5.

In operation, the manipulator arm 14 is controlled such the radiation sensor 28 has a predefined distance to the building surface to be measured, for example the wall 10 and/or the floor 9. In such a case the at least one distance sensor and/or the at least one internal controller 22, forms the distance control device.

Thus, the distance control device 32 enable the robot vehicle 1 to position the radiation sensor 28 at a predefined distance to the building surface 9, 10.

Figure 6:
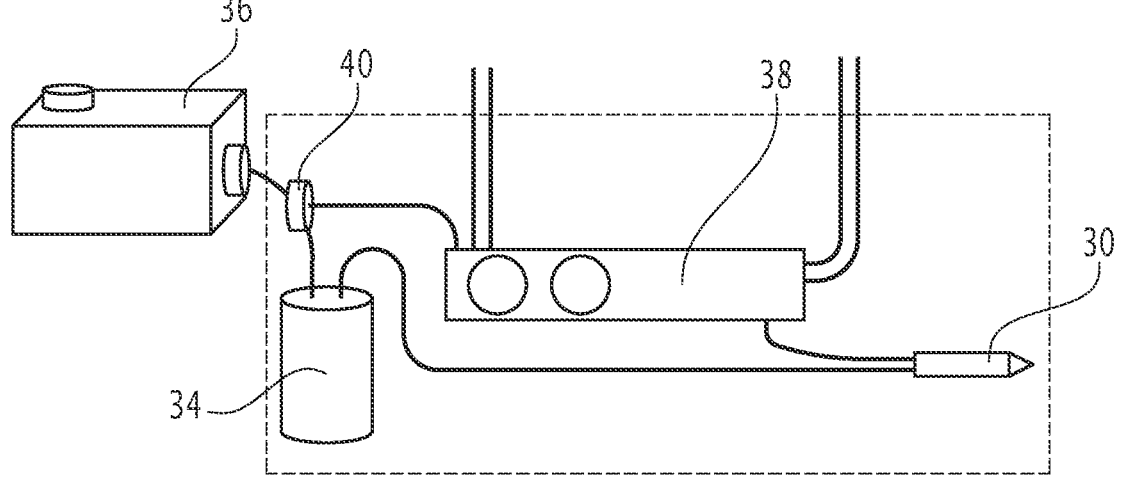
FIG. 6 shows schematically a marking system used by the robot vehicle.

FIG. 6 details a spraying system of the robot vehicle 1. The spray nozzle 30 is connected to a pressurized paint tank 34. The pressurized paint tank 34 is pressurized with pressurized air from a compressed air tank 36. The spray system further includes a spray controller 38, which controls a valve within the spray nozzle 30 and a pressure reducer 40 arranged in a fluid connection between the compressed air tank 36 and the pressurized paint tank 34. With the controllable pressure reducer 40, the pressure of the paint exiting the nozzle can be controlled.

In other words, the spray system is adapted to eject drops of paint against a surface, in particular the building surface 9, 10, for example the wall 10 and/or the floor 9. The number of drops and the speed of the drops can be controlled using the spray controller 38. For example, the speed of the drops is controlled by the pressure in the paint tank 34 and adapted to the distance between the building surface 9, 10 and the spray nozzle 30 and/or the sensor support device 26. The number of drops depends on the speed of the spray nozzle 30 and/or the sensor support device 26 with respect to the building surface 9, 10, in particular in parallel to the building surface.

Thus, detailed patterns, for example lines, dotes, characters and the like can be sprayed on the surface, for example the wall 10 and/or floor 9, using the manipulator arm 14 provided with the spray nozzle 30.

The spray direction of the spray nozzle 30 is preferably parallel to the measurement direction X of the radiation sensor 28.

The at least one internal controller 22 and/or remote controller 20 are adapted to determine the distance between the spray nozzle 30 and the surface or target building surface 9, 10, in particular based on the plurality of sensors and/or cameras 5 of the robot vehicle 1 and/or sensors in the manipulator arm 14. Depending on the determined distance, the spray controller 38 controls the valve within spray nozzle and/or the pressure in the paint tank 34.

According to embodiments, the paint tank 34, the spray controller 38, the pressure reducer 40 and/or the pressurized air tank 36 are fixed to the body 3 of the robot vehicle 1. Thus, the weight to be moved by the manipulator arm 14 is reduced.

In some embodiments, a sample taking device may be fixed to the manipulator arm 14. For example, the sample taking device may be a chisel for creating a scratch samples and/or a drill bit, wherein the created dust is collected by a collecting device, for example an aspirator.

In the following, the functioning of the robot vehicle 1 and of the method according an embodiment will be explained. The method may be performed using the robot vehicle 1 or by the robot vehicle 1. In some embodiments all steps are performed by the at least one internal controller 22 of the robot vehicle, in other embodiments a portion of the steps are performed by the at least one internal controller 22 and another portion of the steps are performed by one or more remote controllers 20. In other words, the method according to embodiments disclosed herein is computer implemented, and in particular executed on one or more controllers, which may be remote to each other.

Figure 7:
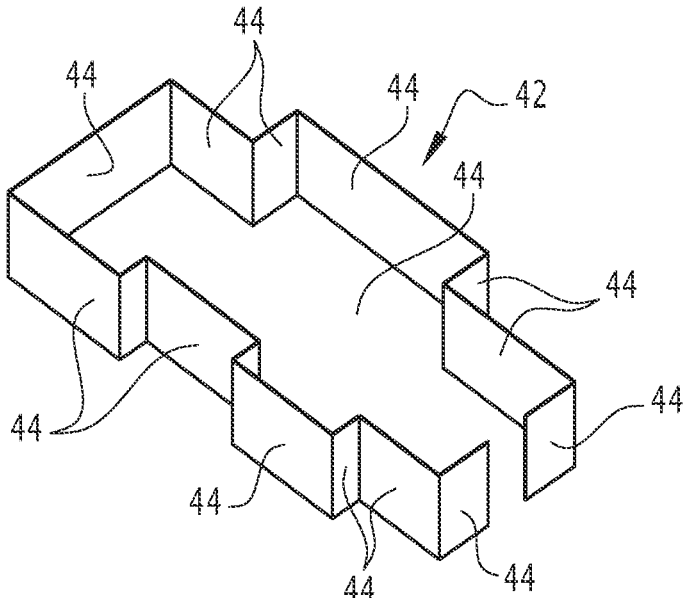
FIG. 7 shows schematically a created virtual map.

In a first step 1010, the robot vehicle 1 explores at least a portion of the building 7 and scans the building surfaces 9, 10, in particular the floor 9 and/or the walls 10, with the at least one sensor and/or cameras 5. For example, the data obtained by the plurality of sensors and/or cameras 5 are then used to generate a 3D map 42 of at least of a portion of the building 7. The 3D map 42 includes a plurality of segments 44. Each segment represents flat sections of building surfaces. For example, each segment represents a flat section of the building surfaces 9, 10, in particular the wall 10 and/or the floor 9. FIG. 7 shows such an example of a virtual 3D map 42. In other words, in a first step 1010, the 3D map 42 of the portion of the building 7 is acquired. For example, a SLAM (simultaneous localization and mapping) or CML (concurrent mapping and localization) algorithm may be used for that purpose.

In some embodiments, the robot vehicle 1 can explore the at least one portion of the building 7 automatically. In other embodiments, an operator guides the robot vehicle 1 through the at least one portion of the building 7, for example by using the remote controller 20. For example, a 3D map 42 of one or more rooms is acquired.

According to embodiments, the portion of the building is explored at least twice. This enables to create a 3D map with a higher precision.

In step 1020, one or more segments 44 of the building 7 is segmented to form a grid of sectors, which have preferably the same size. In other words, a grid of sectors 46 is applied to each segment 44. The plurality of sectors 46 are adjacent to each other. In other words, each sector has at least one adjacent sector 46.

Figure 8:
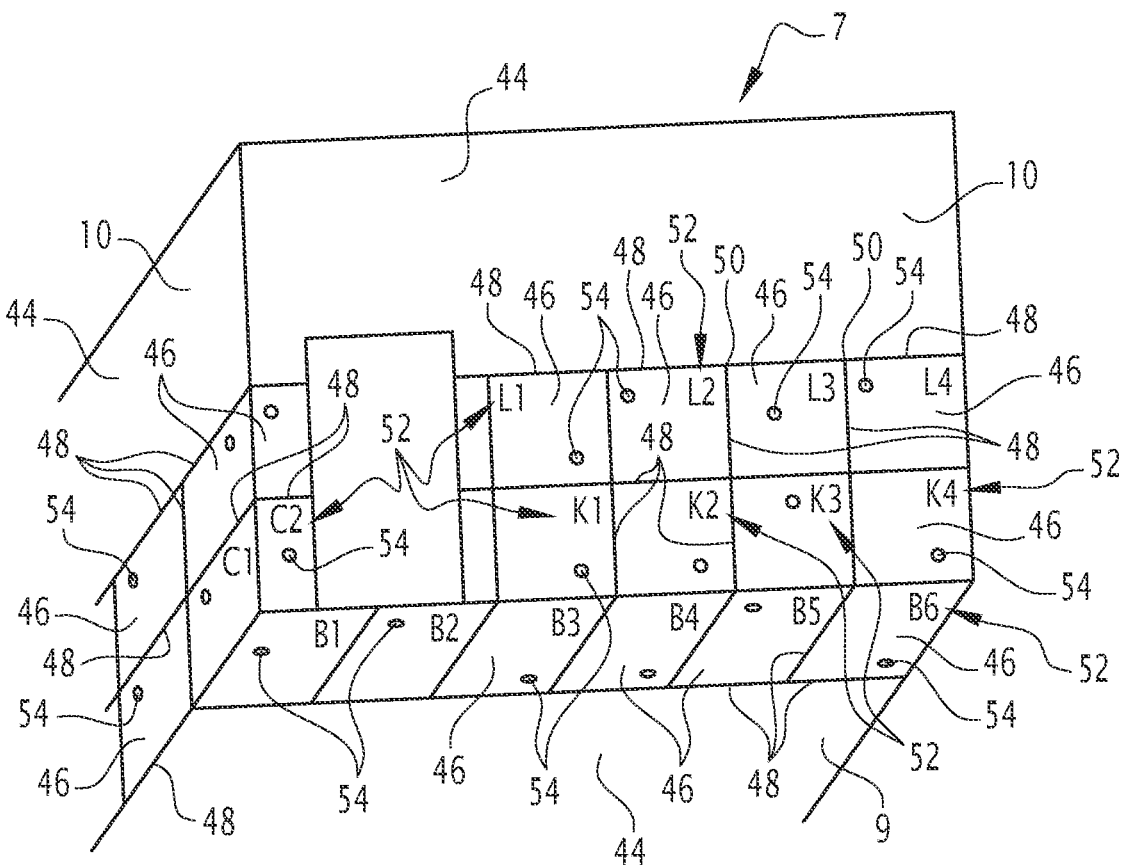
FIG. 8 shows a wall and floor with an applied grid.
Figure 9:
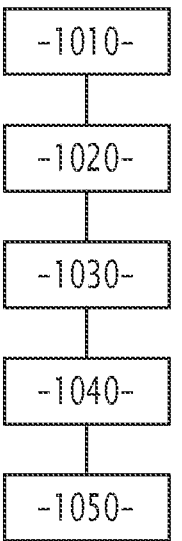
FIG. 9 shows a flow chart of a method according to an embodiment.

For example, at least two, in particular at least 50% of the sectors 46 have a predetermined size. For example, the predetermined size corresponds to a surface on the wall and/or the floor of between 0.75 m² and 1.5 m². In some embodiments, only the sectors at the border of the segments 44 have a smaller size compared to the predetermined size. Typically, the sectors 46 have a regular shape or a rectangular shape. In some embodiments, the sectors 46 of the predetermined size have a square shape. In an embodiment, the square has a size corresponding to 1 m×1 m on the surfaces of the building, here the walls 10 and/or the floor 9. In other embodiments, the sectors 46 may have a hexagonal shape or triangular shape. FIG. 8 shows an example of a building 7, wherein to each segment, here the walls 10 and the floor 9, is applied a grid of sectors 46.

The sectors 46 are also stored in the 3D map 42 of the building 7. For example, the sectors 46 may be stored in the at least one internal controller 22 or the remote controller 20. In an example, the sectors 46 may be digitally or virtually marked in the 3D map 42.

Then, the robot vehicle 1 moves through the building 7 and physically marks the borders 48 of each sector 46 with the paint on the respective building surface. For example, the robot vehicle 1 approaches a building surface 9, 10 and uses the spray nozzle attached to the distal end of the manipulator arm 14 to mark with paint at least the corners 50 of each sector 46. In an example, a "T"-shaped symbol, a "+"-shaped symbol or an "L"-shaped symbol can be used depending on whether there are adjacent sectors or not.

In some embodiments, the complete border 48 of the sector 46 is marked with paint on the building surface 9, 10. In other words, a continuous line of paint surrounds each sector 46 to form the border 48.

The paint is applied to the building surface 9, 10, for example the at least one wall 10 and/or the floor 9, such that the marked borders 48 on the building surface 9, 10 corresponds to the borders of the sectors 46 in the 3D map 42.

The marked border 48 of the sectors 46 enable the robot vehicle 1, to identify and locate at a later step each sector 46 with a high precision. For example, the movement of the manipulator arm 14, in particular of the sensor support device 26, is controlled based on the recognition of the marked borders 48 of the sectors 46 on the building surfaces.

According to some embodiments, each segment 46 is associated with a unique identifier 52, which is also stored in the 3D map and/or associated with the respective sector 46 in the 3D map 42. The identifier 52 may have one or more characters. In an embodiment, the robot vehicle 1 also physically marks each sector 46 with its identifier 52 using the paint and the spray nozzle 30.

In step 1030, the robot vehicle 1, the remote controller 20, or an operator selects one or more sectors 46. In some embodiments, all sectors 46 are automatically selected. The robot vehicle 1 moves close to one of the selected sectors 46 and moves the manipulator arm 14, such that the radiation sensor 28 has a predefined distance to the surface of said sector 46.

For example, when using the stoppers 32, the manipulator arm 14 is moved towards the building surface 9, 10 of the sector, until each stopper 32 touches that surface. This can be for example detected by determining the force applied to each joint motor of the manipulator arm 14.

According to embodiments, the robot vehicle 1 uses the marked borders 48 of the sectors 46 to precisely navigate through the portion of the building 7 and/or to precisely move the manipulator arm 14, in particular for measuring the radiation using the radiation sensor 28, as explained here-below.

Then, in step 1040, the manipulator arm 14 moves the radiation sensor 28 along the complete surface of the respective sector 46 and the measured radiation values are recorded by the at least one internal controller 22 and/or the remote controller 20. In other words, the complete surface of the respective sector 46 is scanned with the radiation sensor 28. During that time, the stoppers 32 remain on the surface of the respective sector 46, such that the radiation sensor 28 has always the same distance to the surface of the sector 46 under inspection. In case distance sensors are used, the movement of the manipulator arm 14 is controlled, such that the distance between the radiation sensor 38 and the surface of the sector 46 remains substantially constant.

For example, the robot vehicle 1 is adapted to acquiring at least one image of a building surface 9, 10, determine the borders 48 of sectors 46 on the building surface 9, 10 based on the acquired image and to move the robot vehicle 1 and/or a manipulator arm 14 of the robot vehicle 1 based on the determined borders 48 during a scanning with the radiation sensor 28. For example, the plurality of sensors and/or cameras 5 may be used for acquiring the at least one image of the building surface. The image may be an image including depth information, for example an RGB-D image. The at least one internal controller 22 and/or remote controller 20 may than use one or more image recognition algorithms in order to determine the borders 48 of the sectors and their position on the building surface 9, 10 and/or with respect to the robot vehicle 1.

In some embodiments, which may be combined with other embodiments disclosed herein, the measured radioactive radiation is displayed on the 3D map 42, for example using a colour code.

In step 1050, after the complete sector 46 has been scanned with the radiation sensor 28, a point 54 within the sector 46 with the highest measured radiation is determined. Then, the robot vehicle 1 is instructed to mark that point 54 with paint, in particular by using the spray controller 38 and the spray nozzle 30. For example, the point 54 may be marked with a dot, a rectangle, in particular defining the borders of the radiation measurement of the radiation sensor 28. In other words, for each sector 46 the point 54 with the highest measured radiation is physically marked. Optionally, in some embodiments, the point 54 is virtually marked in the 3D map 42.

In an optional step, if the manipulator arm 14 is provided with the sample taking device, for example at the point 54 with the highest radiation a sample is taken.

In some embodiments, if the measurement of the radiation of the sector 46 is finalized, the robot vehicle 1 may mark that it has finished that sector. This may facilitate a later control by a human and/or a human/machine cooperative work.

According to the present disclosure, the radiation measurements of the robot vehicle 1 can be manually confirmed. Thus, the radiation measurements realized by the robot vehicle can be used for a clearance measurement of portions of the building 7. In other words, the radiation measurements may be used for confirming that the remaining radioactive radiation does not exceed a predetermined level, in particular before the building is destroyed or otherwise used.

According to the present disclosure, the radioactive dose to persons performing the measurements is reduced. Further, the time for performing the measurements can be reduced using the robot vehicle 1. Further, the accuracy is increased as the robot vehicle may use the marking on the building surfaces for the orientation.

According to some embodiments, the 3D map with the associated results of the radiation measurements can be used for a prediction of radioactive contamination.

The present disclosure relates to a robot configured for automatically mapping the radiation in a building, in particular in a building of nuclear power plant. This robot comprises the plurality of sensors and cameras, configured for acquiring a 3D map of the area and a radiation sensor, configured for measuring the radiation throughout the considered area, and a computation device, configured for displaying the radiation measurements on the 3D map so as to obtain a 3D cartography of the radiation levels in the considered area.

What is claimed is:

1. A method for automatically mapping the radiation in a portion of a building using a robot vehicle, the portion of the building comprising a plurality of building surfaces, the method comprising:

acquiring a 3D map of a portion of a building, wherein the 3D map comprises a plurality of segments, each representing a corresponding substantially flat building surface;

applying to each segment a plurality sectors forming a grid of sectors, each sector having a border;

physically marking, by the robot vehicle, the border of each sector with paint on the corresponding building surface; and for one or more sectors, scanning, by the robot vehicle, with a radiation sensor each sector, to measure a radioactive radiation within that sector.

2. The method according to claim 1, further comprising marking physically with paint a point on the building surface within each scanned sector with a highest measured radiation within the respective sector.

3. The method according to claim 1, further comprising digitally marking the grid of sectors in the 3D map.

4. The method according to claim 1, further determining whether the radiation exceeds a predetermined radiation dose, and in case the radiation exceeds a predetermined radiation dose, marking physically the sector on the building surface by applying paint thereon.

5. The method according to claim 1, wherein each sector is marked, by the robot vehicle, on the building surface with an identifier using paint.

6. The method according to claim 1, further comprising displaying the measured radioactive radiation on the 3D map.

7. The method according to claim 1, further comprising taking, by the robot vehicle, a sample of the building surface in at least one sector.

8. The method according to claim 7, wherein a sample of the building is taken in a point with a highest measured radiation within the at least one sector.

9. The method according to claim 1, wherein the physically marking is performed by spraying paint on the building surface.

10. The method according to claim 1, wherein the robot vehicle comprises a manipulator arm having a proximal end and a distal end and wherein a sensor support device being fixed to the distal end of the manipulator arm, the method further comprising, acquiring by the robot vehicle at least one image of the building surface, determining the borders of the sectors on the building surface based on the acquired image, and moving the robot vehicle and/or the manipulator arm of the robot vehicle based on the determined borders during scanning.

* * * * *